2,996,521
α-AMINO-β-HYDROXYCARBOXYLIC ACID
DERIVATIVES
Virgil E. Matthews and Fred W. Stone, Charleston, W.
Va., assignors to Union Carbide Corporation, a corporation of New York
No Drawing. Filed Sept. 18, 1958, Ser. No. 761,703
9 Claims. (Cl. 260—349)

This invention relates to α-amino-β-hydroxycarboxylic acid derivatives and to a method for their preparation. In a particular aspect, this invention relates to a novel process for converting glycidic esters into a class of amino acids many members of which are valuable because of their biological activity.

α-Amino-β-hydroxycarboxylic acid derivatives are important chemical compounds because they include essential amino acids which are required for normal metabolism in animals. The literature is replete with arduous methods for producing α-amino-β-hydroxycarboxylic acid derivatives and methods for separating diastereoisomeric mixtures of these materials, such as the production and separation of a mixture of DL-threonine and DL-allothreonine. One such synthetic method involves the conversion of 2 - methoxy - 1 - propanol to 2-methoxypropionaldehyde followed by treatment with ammonium cyanide to yield the β-methoxy derivatives of DL-threonine and DL-allothreonine. In another method, acetaldehyde is condensed with ethyl nitroacetate to produce ethyl α-nitro-β-hydroxybutyrate, and this product is reduced and hydrolyzed to produce a mixture of DL-threonine and DL-allothreonine. In still another method, DL-threonine is synthesized from isocrotonic acid via α-bromo-β-methoxybutyric acid and α-bromo-β-methoxybutyric acid piperidide as intermediates. One method of separating DL-threonine and DL-allothreonine involves fractional crystallization of the mixed sodium salts. Another method involves chromatographic separation of the racemates on an ion-exchange resin.

One of the most attractive possible routes to α-amino-β-hydroxycarboxylic acid derivatives is by the simple addition of ammonia to glycidic esters. However, the addition occurs substantially in a stereospecific manner to yield α-hydroxy-β-aminocarboxylic acid derivatives rather than the desired α-amino-β-hydroxycarboxylic acid derivatives. Hence, there is no known method in the art for producing α-amino-β-hydroxycarboxylic acid derivatives from a readily available starting material in a simple, economical, one-step process which is commercially attractive.

It is an object of this invention to provide an improved method for producing α-amino-β-hydroxycarboxylic acid derivatives.

It is another object of this invention to provide a method for producing α-amino-β-hydroxycarboxylic acid derivatives which yields only a single racemic pair of α-amino-β-hydroxycarboxylic acid isomers.

It is still another object of this invention to provide α-amino-β-hydroxycarboxylic acid derivatives by a simple, one-step method which is feasible for commercial utility.

Other objects and advantages of this invention will become apparent to those skilled in the art from the accompanying description and disclosure.

One or more of the objects of this invention are accomplished by a process which comprises reacting a glycidic ester with a compound selected from the group consisting of alkali metal amides and alkali metal azides.

Glycidic esters particularly amenable to the transformation process of this invention are those corresponding to the general formula:

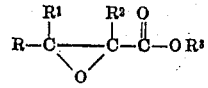

wherein R, R¹ and R² are substituents selected from the group consisting of hydrogen, alkyl, alkenyl, cycloalkyl, cycloalkenyl, aryl, alkaryl and aralkyl, and the total number of carbon atoms in said R, R¹ and R² substituents does not exceed about twelve; and wherein R³ is any suitable alcohol moiety, and is preferably an aliphatic radical containing between one and about ten carbon atoms. The substituents R, R¹ and R² can be identical radicals or they can be different. The substituents can contain nitrogen, silicon, phosphorus, sulfur, halogen and the like, in addition to carbon, hydrogen and oxygen.

Illustrative of glycidic esters which can be employed are glycidate derivatives (e.g., wherein R³ is methyl, ethyl, butyl, n-octyl, 2-ethylhexyl, decyl, and the like) such as (methyl) glycidate; β-methylglycidate; α-ethylglycidate; β,β-diethylglycidate; α-ethyl-β-propylglycidate; α-allyl-β-butylglycidate; α - pentyl-β-ethyl-β-butenylglycidate; β-phenylglycidate; p-methylphenylglycidate; β-benzylglycidate; α-phenyl-β-ethylglycidate; β,β-diphenylglycidate; α-methyl-β-naphthylglycidate; α-ethyl-β-cyclohexylglycidate; α-methyl-β,β-dicyclopentylglycidate; α-methyl-β-(β-ethoxyethyl)glycidate; α - (β-butoxyethoxyethyl)-β-methylglycidate; β-ethylthioglycidate; and the like.

The term "anionic nitrogen reagent" as used hereinafter refers to the alkali metal amides and alkali metal azides employed in the process of the instant invention.

The anionic nitrogen reagents which are preferred for interaction with glycidic esters include lithium amide, sodium amide, potassium amide, sodium azide and potassium azide.

The ratio of reactants employed in the process to produce α-amino-β-hydroxycarboxylic acid derivatives can vary over a broad range between about 0.1 and 5 moles of anionic nitrogen reagent for each mole of glycidic ester reacted. An excess of anionic nitrogen reagent is usually employed in the process in order to minimize the interaction between an α-amino-β-hydroxycarboxylic acid derivative product as it is formed and the glycidic ester starting material. The oxirane oxygen group of the glycidic ester is susceptible to addition reactions by the reactive functional groups of the α-amino-β-hydroxycarboxylic acid derivative product. The quantity of anionic nitrogen reagent employed is preferably in the range between about 1.5 and 3.0 moles for each mole of glycidic ester.

A convenient method for conducting the process to produce optimum yields is by adding the glycidic ester slowly with good stirring to an excess of the anionic nitrogen reagent. The reaction temperature can vary between about 0° C. and 150° C., with between about 10° C. and 60° C. being the preferred range. A reaction time between about one and about thirty hours will usually suffice to complete the reaction, depending on the reaction temperature and on the reactivity of the reactants in a particular reaction system. The glycidic ester can be added as a solution in an inert solvent, or, without a solvent when the glycidic ester is a liquid. When the anionic nitrogen reagent being reacted is an alkali metal azide, it is conveniently introduced as a solution in water or an inert solvent such as tetrahydrofuran, dioxane and other ethers, and other solvents having satisfactory solubility properties. Alkali metal amides can be conveniently reacted as a suspension in an inert solvent such as ethylbenzene, anisole, and other aromatic solvents, or in solvents such as hexane, heptane, isooctane, diethyl ether, diisopropyl ether, methyl butyl ether, dioxane, and the like. Any solvent can be employed in the process which is inert to the reactants and to the reaction products.

The recovery of the reaction products can be accomplished by distillation, crystallization or other common expediency, depending on the method which is applicable in a particular case. The reaction of an alkali metal amide with a glycidic ester yields an alkali metal alcoholate of α-amino-β-hydroxycarboxylic acid ester and an alkali metal alcoholate of α-amino-β-hydroxycarboxylic acid amide as derivatives of the glycidic ester. These amino derivatives can be recovered as such, or more conveniently, both amino derivatives can be converted by simple hydrolysis, e.g., under acid conditions with mineral acids, to the same α-amino-β-hydroxycarboxylic acid as the single product of hydrolysis. The reaction of an alkali metal azide and a glycidic ester yields an alkali metal alcoholate of α-azido-β-hydroxycarboxylic acid ester as a transformation product of the glycidic ester. This product can be treated with hydrogen to reduce the azido group to an amino group, and then the reduced ester product can be hydrolyzed to yield α-amino-β-hydroxycarboxylic acid. The reduction of the azido group is ordinarily conducted in the presence of a catalyst such as Raney nickel, or palladium or platinum on charcoal.

By the reaction of glycidic esters with alkali metal azides, a novel class of interesting azide derivatives can be produced corresponding to the formula:

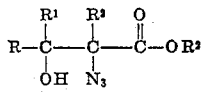

wherein R, $R^1$ and $R^2$ are substituents selected from the group consisting of hydrogen, alkyl, alkenyl, cycloalkyl, cycloalkenyl, aryl, alkaryl and aralkyl, and the total number of carbon atoms in said R, $R^1$ and $R^2$ substituents does not exceed about twelve; and wherein $R^3$ is hydrogen or an aliphatic radical containing between one and about ten carbon atoms. Illustrative of the useful compounds of this class are the methyl, ethyl, isopropyl, decyl and the like derivatives of 2-azido-3-hydroxybutyrate; 2-azido-3-hydroxydecanoate; 2-azido-3-methyl-3-hydroxyhexanoate; 2-azido-3-phenyl-3-hydroxyheptanoate; 2-azido-3-(cyclohexenyl)-3-hydroxypentanoate; 2-azido-2-allyl-3-hydroxyoctanoate; 2-azido-2-ethyl-3-hydroxy-heptanoate, and the like, and the free carboxylic acid forms of these compounds.

The mechanism of the reaction process appears to be a stereospecific Sn2 trans opening of the oxirane group at the α-carbon atom of the glycidic ester. A single pair of enantiomorphs results from substituted glycidic ester in which two assymetric carbon atoms are produced by the oxirane ring opening. If the addition were not stereospecific (e.g., if the addition of anionic reagent to the oxirane ring occurred both cis and trans) then a second pair of enantiomorphs would be produced which were diastereoisomeric with the first pair of enantiomorphs. The stereospecificity of the reaction process of this invention is highly advantageous in that pure enantiomorphic pairs are produced directly without a difficult and sometimes impossible operation of separating diastereoisomers. For example, ethyl trans-2,3-epoxybutyrate is converted to DL-allothreonine (erythro isomer pair), and ethyl cis-2,3-epoxybutyrate is converted to DL-threonine (threo isomer pair).

Further, the fact that the Sn2 trans attack of the amide and azide anions occurs substantially at only the α-carbon atom, the process permits the ready synthesis of α-amino carboxylic acid derivatives which are biologically important, e.g., threonine is an essential amino acid required by animals for normal metabolism. The attack of the amide and azide anions at the α-carbon atom is unexpected in view of the behavior of ammonia and other unsymmetrical reagents with glycidic esters to produce products that result from anionic attack at the β-carbon atom. Hence, the reaction of glycidic ester itself (where $R^1$ and $R^2$ are hydrogen) with an alkali amide produces almost exclusively the valuable amino acid DL-serine (α-amino-β-hydroxypropionic acid).

The glycidic esters employed in the practice of this invention are readily available by several well-known synthetic routes. A common method of preparation is the Darzens reaction which is the condensation of an appropriate carbonyl compound with an α-halo ester in the presence of a strong base. Another route to glycidic esters is by the reaction of a base with an α,β-halohydrin ester. Still another method of preparation is by the epoxidation of an α,β-unsaturated ester.

The following examples will serve to illustrate specific embodiments of the invention.

Example 1

Sodium azide (58.3 grams) was dissolved in 165 grams of water, and to the solution with stirring was added ethyl trans-2,3epoxybutyrate (103.5 grams) over a period of 1.75 hours. The mixture was stirred at room temperature for twenty hours, and then at a temperature of 40° C. for an additional three hours. The reaction mixture was extracted with methylene chloride in one 200 milliliter portion and two 100 milliliter portions and the combined extracts were dried over anhydrous sodium sulfate. The methylene chloride was removed by distillation at atmospheric pressure, and the residual organic liquid was fractionated under reduced pressure. A liquid boiling at 77° C. to 82° C./1.2–2 millimeters of mercury and having a refractive index $n_D^{20}=1.4550$ was isolated. Repeated fractionation of this material gave 25 grams of a product, boiling point 73.4° C. to 74.2° C./10.7 millimeters of mercury and $n_D^{20}=1.4562$, which had the infrared spectrum (hydroxyl, 2.9μ; azido, 4.7μ and 7.9μ; ester, 5.7μ) and elemental analysis (calculated for $C_6H_{11}O_3N_3$:

C, 41.61; H, 6.40; N, 24.27—found: C, 41.84; H, 7.07; N, 23.65) expected for ethyl 2-azido-3-hydroxybutyrate. This product (18.1 grams) was dissolved in 100 grams of ethanol and hydrogenated in the presence of 2 grams of 5 percent palladium on charcoal at room temperature under 70 atmospheres of hydrogen pressure over a period of five hours.

The crude reaction mixture from the hydrogenation step was acidified by the addition of 80 grams of concentrated hydrochloric acid and 120 grams of water, and hydrolysis was accomplished by refluxing the mixture for six hours. The water and hydrochloric acid were removed under reduced pressure. The resulting amber oil was dissolved in 260 grams of hot isopropanol, decolorized, and mixed with 10 grams of freshly distilled aniline with stirring. Upon cooling, a white solid precipitated which upon recrystallization from a 5 to 1 ethanol-water mixture yielded approximately 1.5 grams of DL-allothreonine.

The experiment was repeated and DL-allothreonine was produced without isolation of the intermediate azido ester before the hydrogenation step.

Example 2

Liquid ammonia (200 grams) was condensed in a flask equipped with a stirrer, an inlet tube for dry air, and a wide bore blowout tube filled with soda-lime. To the liquid ammonia was added metallic sodium (0.25 gram) which was dissolved with stirring. Dry air was slowly bubbled through the solution until the blue color disappeared, and additional sodium (6 grams) was then added over a period of one hour.

The contents of the flask were gradually cooled to room temperature with the dropwise addition of dry ethylbenzene (150 grams). To the ethylbenzene solution was added, dropwise and with cooling, ethyl trans-2,3-epoxybutyrate (30 grams) dissolved in ethylbenzene (60 grams). The contents of the reaction vessel were maintained at a temperature less than 35° C. by external cooling during the course of the addition.

When the addition was complete, distilled water (50 grams) was slowly added to the reaction mixture. When the water addition had been completed, the reaction mixture consisted of a clear colorless hydrocarbon layer and a deep brown aqueous layer. The two layers were separated and the hydrocarbon layer was discarded.

The aqueous layer of the reaction mixture was acidified by the addition of concentrated hydrochloric acid (80 grams) in 100 grams of water. The acidified mixture was heated to boiling and refluxed for a period of twelve hours during which time the vapors were gradually permitted to escape. At the end of this period, the distillate no longer gave any indication of the presence of ethanol. The water and hydrogen chloride were then removed under reduced pressure and the resulting crystalline material was dissolved in 500 grams of boiling isopropanol, decolorized, and mixed with 15 grams of freshly distilled aniline. Upon standing at room temperature, a crystalline mass precipitated from the solution which was filtered and dried. A second crop of crystalline material was obtained by boiling the isopropanol filtrate down to 50 percent of its previous volume and cooling. The combined crystalline product weighed 7 grams and represented a 25.5 percent yield of DL-allothreonine based on ethyl trans-2,3-epoxybutyrate.

What is claimed is:

1. The process which comprises reacting at a temperature between 0° C. and 150° C. a glycidic ester with a compound selected from the group consisting of alkali metal amide and alkali metal azide, said glycidic ester having the formula

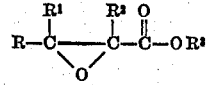

wherein R, R¹ and R² are substituents selected from the group consisting of hydrogen and alkyl, and the total number of carbon atoms in said R, R¹ and R² substituents does not exceed about twelve; and wherein R³ is selected from the group consisting of hydrogen and aliphatic radicals containing between one and about ten carbon atoms.

2. The process for producing α-amino-β-hydroxycarboxylic acid esters which comprises treating a glycidic ester at a temperature between 0° C. and 150° C. with an alkali metal amide to cause interaction of said alkali metal amide with the oxirane group of said glycidic ester, said glycidic ester having the formula

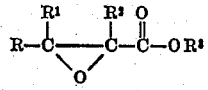

wherein R, R¹ and R² are substituents selected from the group consisting of hydrogen and alkyl, and the total number of carbon atoms in said R, R¹ and R² substituents does not exceed about twelve; and wherein R³ is selected from the group consisting of hydrogen and aliphatic radicals containing between one and about ten carbon atoms.

3. The process for producing α-azido-β-hydroxycarboxylic acid esters which comprises treating a glycidic ester at a temperature between 0° C. and 150° C. with an alkali metal azide to cause interaction of said alkali metal azide with the oxirane group of said glycidic ester, said glycidic ester having the formula

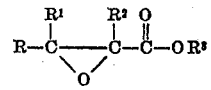

wherein R, R¹ and R² are substituents selected from the group consisting of hydrogen and alkyl, and the total number of carbon atoms in said R, R¹ and R² substituents does not exceed about twelve; and wherein R³ is selected from the group consisting of hydrogen and aliphatic radicals containing between one and about ten carbon atoms.

4. The process which comprises reacting together trans-2,3-epoxybutyrate ester and an alkali metal amide at a temperature between 10° C. and 60° C. to form an intermediate addition product, and hydrolyzing said intermediate addition product under acid conditions to produce DL-allothreonine.

5. The process which comprises reacting together trans-2,3-epoxybutyrate ester and an alkali metal azide at a temperature between 10° C. and 60° C. to form an intermediate addition product, reducing the azido group of said intermediate addition product to an amino group with hydrogen, and hydrolyzing the reduced derivative under acid conditions to produce DL-allothreonine.

6. Compounds of the formula:

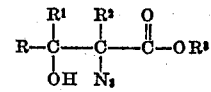

wherein R, R¹ and R² are substituents selected from the group consisting of hydrogen and lower alkyl, and the total number of carbon atoms in said R, R¹ and R² substituents does not exceed about twelve; and wherein R³ is selected from the group consisting of hydrogen and aliphatic radicals containing between one and about ten carbon atoms.

7. Ethyl 2-azido-3-hydroxybutyrate.

8. The process which comprises reacting together cis-2,3-epoxybutyrate ester and an alkali metal amide at a temperature between 10° C. and 60° C. to form an intermediate addition product, and hydrolyzing said intermediate addition product under acid conditions to produce DL-threonine.

9. The process which comprises reacting together 2,3-epoxypropionate ester and an alkali metal amide at a temperature between 10° C. and 60° C. to form an intermediate addition product, and hydrolyzing said intermediate addition product under acid conditions to produce DL-serine.

No references cited.